June 20, 1967　　　　　　H. KAUPPI　　　　　　3,326,525
TILT UP RAMP FOR VEHICLES
Filed Dec. 13, 1965
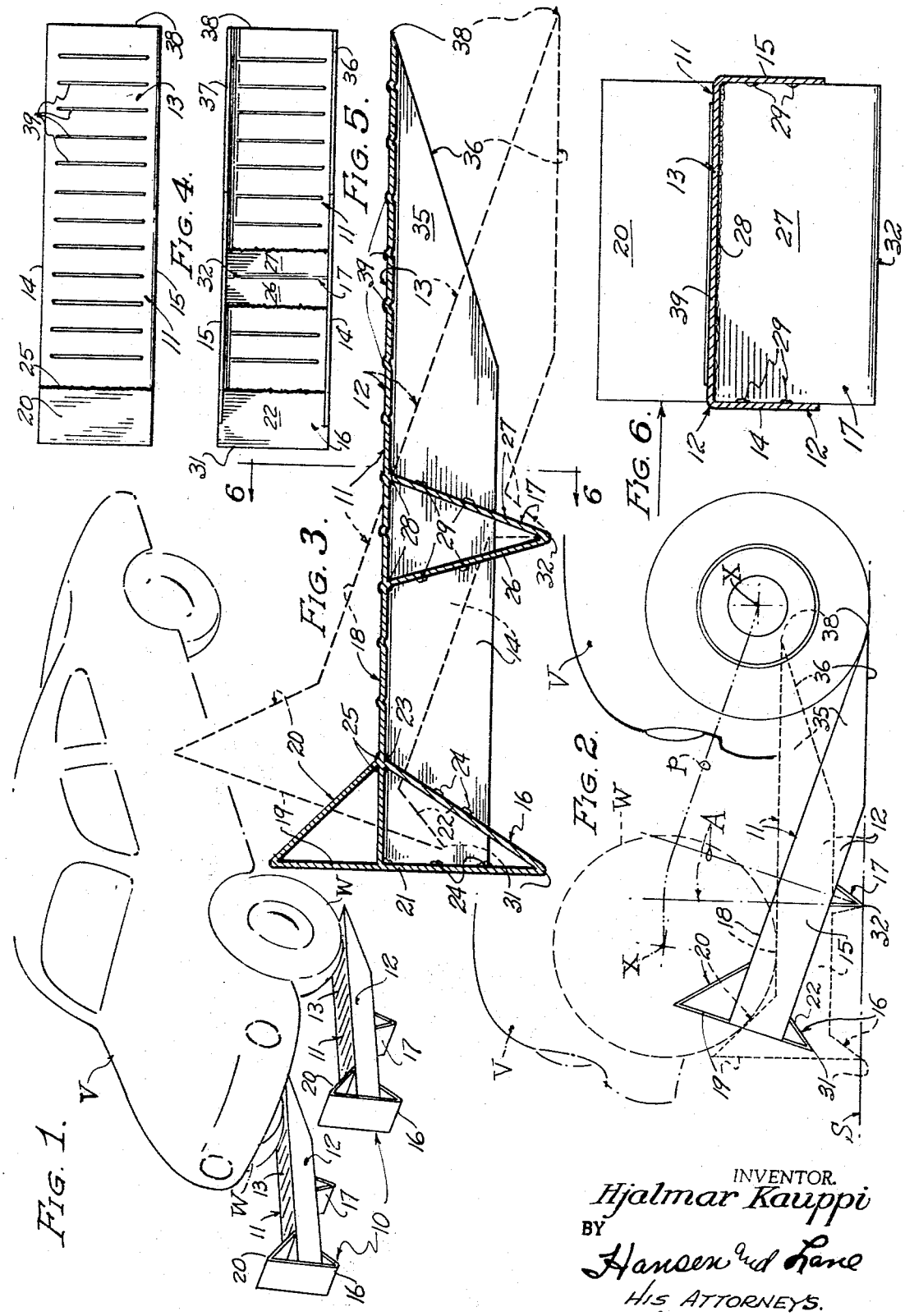
INVENTOR.
*Hjalmar Kauppi*
BY
*Hansen and Lane*
HIS ATTORNEYS.

United States Patent Office 3,326,525
Patented June 20, 1967

3,326,525
TILT UP RAMP FOR VEHICLES
Hjalmar Kauppi, 12530 Linda Vista,
San Jose, Calif. 95127
Filed Dec. 13, 1965, Ser. No. 513,491
2 Claims. (Cl. 254—88)

This invention relates to ramps for automobiles and like vehicles.

The ramps are used in the usual manner to elevate one end of a vehicle high enough to allow a person to crawl under to make repairs and service the vehicle.

It is an object of this invention to provide ramps of simple construction which are economical to manufacture and highly efficient and safe in use.

It is another object to provide each ramp as a simple tilt up structure operable by the vehicle as it rolls to and from supported position.

It is yet another object to provide each ramp with a two legged footing, one of which legs acts as a fulcrum under the influence of the wheel of the vehicle as it is driven to and from supported position.

These and other objects and advantages of the present invention will become apparent in the following description and accompanying drawings in which:

FIG. 1 is a perspective view of a pair of ramps embodying the present invention about to receive the vehicle illustrated.

FIG. 2 is a side view of one ramp and a part of the vehicle as illustrated in FIG. 1.

FIG. 3 is an enlarged longitudinal section through the ramp shown in FIGS. 1 and 2.

FIG. 4 is a top plan view of FIG. 2.

FIG. 5 is a bottom plan view of FIG. 2.

FIG. 6 is a cross section through FIG. 3 taken along line 6—6 thereof.

Referring to the drawing a pair of ramps 10 is shown in FIG. 1 about to receive both wheels W at one end of a vehicle V about to be driven onto the ramps. Each ramp of the pair 10 is identical and like reference numerals apply to each.

As viewed in FIGS. 3 and 6 each ramp comprises a unitary structure 11 consisting of a channel shaped body 12 of a desired length. The body 12 has a web serving as a tread 13 and side flanges 14 and 15 which reinforce the tread to support the load received thereby. The flanges 14 and 15 also serve as end walls of feet 16 and 17 and to brace the same relative to the tread 13.

The feet 16 and 17 are secured to the channel 12 in spaced relation between a portion of the tread 13 which is termed a platform 18. The foot 16 is at one extreme end of the ramp 11 and has a portion 19 thereof extending above the platform portion of the tread 13 to provide a bumper or stop 20 of an abrupt angle to prevent the wheel W of a vehicle from over rolling the same.

Each foot 16 and 17 is formed from a metal strap of substantially the same thickness as the material from which the channel 12 is made. In each foot 16 and 17 the metal strap is of a width to fit snugly between the flanges 14 and 15.

The foot 16 and the portion 19 thereof is a single strap of metal having a midportion 21 with a base bracket end 22 bent at an acute angle relative thereto, the extreme end of which abuts the lower surface of the channel web to which it is welded as at 23. The midportion 21 abuts the end of the web 13 and is welded thereto. Tack welds 24 are made at positions along the portion 21 and base 22 to secure the same to the flanges 14 and 15.

The portion 19 of the foot 16 extedns above the web 13 and has a brace end 25 bent down upon the tread and welded thereto preferably directly above the weld 23 between the extreme end of the base bracket 22 of the foot 16.

The other or intermediate foot 17 is a single plate bent back upon itself in the form of an isosceles triangle having an open base and fore and aft sides 26 and 27 of equal length. The ends of these sides 26 and 27 are welded as at 28 to the underside of the tread web 13. Tack welds 29 are provided at several points where the sides 26 and 27 abut the side flanges 14 and 15 of the channel body 12. The altitudinal axis A of the triangular shaped foot is thus disposed perpendicular to the web 13 which forms the base of the isosceles triangle.

Each foot 16 and 17 has an apex end 31 and 32, respectively, which extends beyond the side wall skirt flanges 14 and 15 of the channel shaped body 12. The apexes 31 and 32 are equidistant from the tread web 13 such that the platform portion 18 of the latter will assume parallel relation to a surface engaged by each foot 16 and 17.

In accordance with the present invention the feet 16 and 17 are spaced from each other a distance slightly greater than the radius of a conventional vehicle wheel.

The apex 32 of the intermediate foot 17 acts as a fulcrum edge transverse of the ramp about which edge the entire unitary structure can rock in the plane of its length. That portion 35 of the channel body 12 which is opposite the foot 16 extends freely beyond the intermediate foot 17 and has its side wall flanges 14 and 15 tapered as at 36 and 37 respectively to an apex end 38 at the plane of the tread web 13. The angle $a$ at the apex end 38 of each flange 14 and 15 is any angle most suited to provide spaced feet engageable with the surface S at the apex end of the vehicle ramp. I have found an angle of approximately 19 degrees to be most suitable. The apex 32 of the intermediate foot 17 is disposed on a line extended from the tapered lower edges 36 and 37 of the side wall flanges 14 and 15.

In accordance with the present invention the length of the legs 16 and 17 determines their position relative to the tapered end of the flanges 14 and 15. In other words, the distance between the legs 16 and 17 remain constant (slightly greater than the radius of a conventional vehicle wheel); the apex end angle 38 of the ramp 11 remains constant (approximately 19 degrees); however, if the height of the legs 16 and 17 is increased, that portion 35 of the channel body beyond the platform 18 is increased in length to dispose the apex 32 of the intermediate leg 17 in the plane extended from the tapered edges 36 and 37 of the side wall flanges 14 and 15.

As best seen in FIGS. 1 and 4 the top surface of the tread web 13 is preferably scored, notched or otherwise made non skid. I have shown ribs 39 formed on the web 13 to provide such characteristics as well as to reinforce the web transversely between the skirting flanges 14 and 15.

In use the apex end 38 of each ramp 11 is jambed in chuck-block fashion between the respective side wheels W and the surface $s$ upon which they are supported. In this condition, each ramp 11 has the apex 32 of its intermediate foot 17 on the same surface $s$ the channel like body 12 being inclined therefrom and the end foot 16 being elevated above such surface. Now as the vehicle is driven under its own power slowly toward the ramps 10 the wheels W ascend the now inclined portion 35 of the ramps. As illustrated in FIG. 3, the axles X of each wheel travel in a path $p$ delineated in dot-dash lines until the wheels arrive at an altitudinal axis A extended upwardly from the V-shaped intermediate foot 17. As the wheels pass the altitudinal axes A of each foot 17, the weight of wheels overbalances the fulcrum provided by the apex edges 32 thereby rocking the entire unitary structure of the ramps 10 until the end foot 16 of each ramp 11 engages the surface s. The wheels are now disposed on the platform portion 18 of the respective ramps and the latter assume parallel relation to the surface s. The wheels W abut the stops 20 at the ends of the ramps and the vehicle now has two of its opposite side wheels elevated. With the brakes of the vehicle set the elevated wheels are safely and firmly supported on a flat horizontal platform.

While I have described my tilt up ramp for vehicles in specific detail it will be appreciated that the same may be susceptible to variations, alterations and/or modifications without departing from the spirit of my invention therein. I therefore desire to avail myself of all variations, alterations and/or modifications as may come within the purview of the appended claims.

I claim:

1. A tilt up ramp for elevating the wheel of a vehicle driven onto the ramp comprising:
   (1) an elongated tread member;
   (2) an end foot secured to one end of said tread member and having a base spaced from the latter a distance comparable to the height to which it is desired to elevate such wheel;
   (3) an intermediate foot secured to said tread member in spaced relation to said end foot a distance slightly greater than the radius of such wheel and having an apex end spaced from said tread member a distance equal to that of the base of said end foot therefrom;
   (4) the remaining portion of said tread member extending beyond said intermediate foot a distance to assume an inclined position when its extreme end is set against the tread of such wheel and surface the wheel rests upon, whereby said intermediate foot serves as a fulcrum when such wheel rolls beyond the latter to thereby tilt said tread member into a position in which the base of said end foot rests upon the surface supporting such vehicle;
   (5) said end foot including an upwardly extending end and a downwardly extending angularly disposed integral brace having its end secured to the upper end of said tread member to provide a stop for engaging the tread of the wheel rolled onto said ramp.

2. The device in accordance with claim 1 in which said tread member is a channel shaped member having downwardly extending side wall flanges for reinforcing said tread member and embracing said end foot and said intermediate foot and secured thereto for bracing the same, and in which the side wall flanges have diverging lower edges extending in a plane from the extreme end of the said remaining portion of said tread member toward the apex of said intermediate foot and cooperating with the latter to provide at said apex end of said ramp, spaced feet engageable with the surface supporting such vehicle.

References Cited

UNITED STATES PATENTS

| | | | |
|---|---|---|---|
| 1,408,408 | 2/1922 | Scott | 254—88 |
| 1,569,469 | 1/1926 | Elzey | 254—88 |
| 2,924,427 | 2/1960 | Larson | 254—88 |

OTHELL M. SIMPSON, *Primary Examiner.*